UNITED STATES PATENT OFFICE.

GEORGE BARRETT McMULLEN, OF CHICAGO, ILLINOIS, ASSIGNOR, BY MESNE ASSIGNMENTS, TO ZALMON G. SIMMONS, OF KENOSHA, WISCONSIN, ANDREW W. PRESTON, OF SWAMPSCOTT, MASSACHUSETTS, AND BRADLEY W. PALMER, OF BOSTON, MASSACHUSETTS, TRUSTEES.

PROCESS OF SEPARATING SUGAR-CANE INTO ITS TWO CHIEF STRUCTURAL PARTS.

1,040,559.  Specification of Letters Patent.  Patented Oct. 8, 1912.

No Drawing.  Application filed June 7, 1909. Serial No. 500,499.

*To all whom it may concern:*

Be it known that I, GEORGE BARRETT MC-MULLEN, a citizen of the United States, residing at Chicago, in the county of Cook and State of Illinois, have invented certain new and useful Improvements in Processes of Separating Sugar-Cane into Its Two Chief Structural Parts, of which the following is a specification.

This invention relates to an improved process of separating sugar cane into its two chief structural parts, viz: separating the pith cell structure from the woody shell and fibro-vascular structure, and reducing these two separated portions into new products used for making sugar and other products.

Among the salient objects of the invention are to provide a method whereby an extremely efficient and commercially cheap mechanical separation of the two chief structural portions of the sugar-cane may be effected; to provide a process which enables the resulting separated products to be dried somewhat more economically in certain types of apparatus than could be done were they not so separated, and at the same time lessens the liability of deterioration of the products while drying; to provide a process which while placing the sugar-cane in such condition that substantially the entire 100% of sugar contained therein may be extracted, at the same time and as a result of the sugar extraction, leaves the two by-products in ideal condition for commercial use for any of the purposes for which cellulose of the character contained in sugar-cane is useful; to provide a process which may be carried out by the use of extremely simple and low-cost mechanism, very rapidly, and in the immediate vicinity where the cane is produced, thus enabling the crop to be converted into condition for indefinite preservation rapidly and while it is in prime condition, and making it feasible to transport the products minus the water to factories located at a distance; to provide a process which is characterized by extreme simplicity so that it can be successfully performed by labor of very ordinary skill and such as is readily available in the locality where sugar-cane is largely grown; and in general, to provide an improved method suitable for treating sugar-cane and analogous plants.

In carrying out my improved process, the first step, after the cane has been stripped, cut and brought in, as usual, is to shred the same to a finely divided condition in which the shell portions and the fibro-vascular portions are in the form of fine filaments, and the pith is disintegrated so that it exists intermingled with the filamentary shreds in particles somewhat resembling wet sawdust. This shredding operation I have carried on with great success by the use of a machine in principle like that shown in Patent No. 813,300 granted to J. W. Hyatt February 20, 1906. Of course, there may be other suitable mechanism for performing this shredding. The striking discovery which underlies this invention is the fact that this mass of shredded filamentary shell and disintegrated pith derived from sugar-cane can be separated to a very perfect degree into its two principal parts, viz: the pith portions on the one hand, and the shell and fibro-vascular portions on the other, by a simple screening or sifting operation. I discovered that if this shredded material be taken promptly after it has been shredded, *i. e.* before it has dried or massed together, and be passed over a screen or series of screens which are sharply agitated and of suitable mesh, practically all of the pith particles will pass through the screens while practically all of the filamentary shreds will remain upon the screens. This demonstrated the fact that the shredding operation had effected a practically complete tearing loose or mechanical separation of the pith from the woody fibers. If the screening or shifting operation be repeated through a plurality of screens of suitable mesh, the separation may be made so perfect that what remains of the filamentary or woody fiber in the pith, and vice versa what remains of the pith in the woody fiber are percentages so low as to be negligible for all practical purposes to which these cellulose products have been thus far utilized. The degree of separation or concentration of the respective fractions is such as may be attained by screening under the described conditions, and should be adequate to secure the advantages herein pointed out. For effecting this screening separation I prefer to use ordinary wire screens of suitable mesh; preferably using a series or gang of screens of successively finer mesh, through which the product is sifted. The screens are arranged to be agitated by shaking laterally in a well-understood manner, and are inclined so that the filamentary fiber passes over the screen and is discharged at one end thereof while the pith material passes through. The operation of screening may be performed by a suitably organized screening machine, very rapidly, and at an insignificant expense. It will be obvious that such screening operation will in no wise impair the product for sugar making or tend to change it chemically. I have ascertained and demonstrated, however, that the two products thus separated can be more expeditiously and economically dried in certain types of drying apparatus when thus separated than can be done where the mass is dried without separation. One reason for this undoubtedly is that the two materials, owing to their different character, may be handled more uniformly in being passed through a drier of the type below referred to when treated separately, and again it will be obvious that the filamentary shreds will form a more porous and permeable mass when separated than when mingled with the pith, and accordingly the drier will handle a thicker sheet or larger quantity at a time, and in this way expedite the drying. As regards the pith particles, which when separated much resemble wet sawdust, the said drier may be arranged so as to effect a more thorough tumbling and exposure of the particles to the hot air, so that it turns out that this product can also be more rapidly dried when separated than when mingled with the filamentary material. Inasmuch as the sugar is the most valuable product sought, it is important that the drying be so conducted that the full sugar content shall be preserved in the shredded material uninverted. To this end the drying is preferably conducted at a temperature in the material being dried ranging from 100° to 212° Fahrenheit, and conducted under such conditions that the moisture-laden vapor is withdrawn from the drying material practically as fast as formed. In a pending application filed by George W. McMullen, Serial No. 425,611, filed April 7, 1908, there is set forth and described one form of apparatus which is suitable for drying both of these sugar-cane products.

The importance of my discovery that the two chief structural parts of the sugar-cane can be thus effectually separated as hereinbefore described, is not to be underestimated, and is by no means measured by the advantages of drying hereinbefore described. The resulting products can be extracted and the sugar recovered by diffusion somewhat more rapidly when they are treated separately than when mixed. Another and more important advantage, however, is that the extracted cellulose residue is in ideal condition for converting into pulp for paper making or other uses. These advantages are obviously secured whether the concentration precedes or follows the drying. Many attempts have been made, and much experimentation carried on, with a view of successfully making paper and analogous products from sugar-cane and cornstalks; these two plants presenting some analogies as regards their fiber. It has been demonstrated, and is now well understood, that the ultimate fiber derived from the pith, and that derived from the shell and fibro-vascular parts of the plant, are of entirely distinct characters and quite inharmonious qualities. That is to say, the pith cell fibers tend under ordinary conditions of manufacture to mat together, forming a hard, brittle, parchment-like paper, whereas the shell fiber is of long filamentary character and produces a soft, tough paper. So different in character are these two products that where the attempt has been made to make paper from a mixture of the two kinds of cells,—the pith cells and the filamentary cells,—either in the natural proportions which will obtain in the plant, or in very much less proportions of one than the other, the paper invariably possesses a hard, undesirable, brittle character, which makes it commercially of small value. To illustrate, cornstalks and bagasse have been run through so-called depithing machines, which slitted and scraped the stalks, thereby separating to a considerable extent the pith from the shells. Nevertheless the partially separated products thus secured did not produce good paper because of the imperfect separation and other causes. So also cornstalks and bagasse have been chemically cooked to disintegration, and then the two kinds of cells separated to a more or less degree by washing and screening the pulpy mass. Promising results have been thus secured, but the expense has been great and the process slow. By my present improvement the objections of imperfect separation, tediousness of operation and cost of operation are disposed of. Moreover, the resulting extracted shredded products produced in accordance with my invention are not only in ideal condition as regards thoroughness of separation of the pith from the shell fiber, but the sugar has been extracted practically to a perfect degree, and because of this fact another of the serious difficulties heretofore incident to the making of paper from bagasse is wholly eliminated. That is to say, it has been found that where any considerable percentage of sugar remains in the fiber when it is subjected to chemical treatment, the strong chemical necessary to effect disintegration carbonizes the sugar, producing minute carbon or carbonaceous specks, which discolor the product and makes satisfactory bleaching extremely difficult if not impossible. Obviously, if there be no sugar left in the fiber this difficulty is eliminated.

I claim as my invention:

1. The process of separating undried sugar-cane into its two chief structural parts viz. the pith and the woody fibers, which consists in mechanically reducing the plant to fine shreds and then completing the separation by a screening or shifting operation and separately collecting the two parts.

2. The process of separating sugar-cane undried and containing its natural sugar juices into its two chief structural parts viz. the pith and the woody fibers, which consists in shredding the plant mechanically to a mass composed of pith particles and fine filaments of woody fiber, then completing the separation by screening, and separating that which goes through the screen from that which goes over or is retained upon the screen.

3. The process of separating matured sugar-cane into its two chief structural parts viz. the pith and the woody fibers, which consists in passing the stalks through shredders whereby they are reduced to a mass in which the pith exists in sawdust-like particles and the woody fiber exists in fine filamentary shreds, then completing the separation by passing the mixture through and over a series of graded screens, and separately collecting the two parts, the sugar cane still retaining its natural sugar content after the separation.

4. The improved process of converting sugar cane, which consists in first shredding the cane into a condition in which the pith is reduced to relatively fine sawdust-like particles and the woody constituents to relatively fine excelsior-like filaments and particles, both of which cane constituents retain their sugar contents in the uninverted and uncontaminated condition of nature, thereafter both drying to a permanently stable condition and separating the two constituents, the drying being effected artificially under controlled conditions which preclude any substantial inversion of sugar and reduces the products to a stably dry condition and the separation being accomplished by sifting, whereby two separated products are produced, each stably dry, each impregnated with sugar in its natural uncontaminated condition and each concentrated with reference to the plant structural parts characteristic of the other product.

GEORGE BARRETT McMULLEN.

Witnesses:
FRANK L. BELKNAP,
ANNA O'BRIEN.

---

It is hereby certified that in Letters Patent No. 1,040,559, granted October 8, 1912, upon the application of George Barrett McMullen, of Chicago, Illinois, for an improvement in "Processes of Separating Sugar-Cane Into Its Two Chief Structural Parts," an error appears in the printed specification requiring correction as follows: Page 1, line 92, and page 3, line 16, for the word "shifting" read *sifting;* and that the said Letters Patent should be read with this correction therein that the same may conform to the record of the case in the Patent Office.

Signed and sealed this 10th day of December, A. D., 1912.

[SEAL.]

C. C. BILLINGS,
*Acting Commissioner of Patents.* mains in the fiber when it is subjected to chemical treatment, the strong chemical necessary to effect disintegration carbonizes the sugar, producing minute carbon or carbonaceous specks, which discolor the product and makes satisfactory bleaching extremely difficult if not impossible. Obviously, if there be no sugar left in the fiber this difficulty is eliminated.

I claim as my invention:

1. The process of separating undried sugar-cane into its two chief structural parts viz. the pith and the woody fibers, which consists in mechanically reducing the plant to fine shreds and then completing the separation by a screening or shifting operation and separately collecting the two parts.

2. The process of separating sugar-cane undried and containing its natural sugar juices into its two chief structural parts viz. the pith and the woody fibers, which consists in shredding the plant mechanically to a mass composed of pith particles and fine filaments of woody fiber, then completing the separation by screening, and separating that which goes through the screen from that which goes over or is retained upon the screen.

3. The process of separating matured sugar-cane into its two chief structural parts viz. the pith and the woody fibers, which consists in passing the stalks through shredders whereby they are reduced to a mass in which the pith exists in sawdust-like particles and the woody fiber exists in fine filamentary shreds, then completing the separation by passing the mixture through and over a series of graded screens, and separately collecting the two parts, the sugar cane still retaining its natural sugar content after the separation.

4. The improved process of converting sugar cane, which consists in first shredding the cane into a condition in which the pith is reduced to relatively fine sawdust-like particles and the woody constituents to relatively fine excelsior-like filaments and particles, both of which cane constituents retain their sugar contents in the uninverted and uncontaminated condition of nature, thereafter both drying to a permanently stable condition and separating the two constituents, the drying being effected artificially under controlled conditions which preclude any substantial inversion of sugar and reduces the products to a stably dry condition and the separation being accomplished by sifting, whereby two separated products are produced, each stably dry, each impregnated with sugar in its natural uncontaminated condition and each concentrated with reference to the plant structural parts characteristic of the other product.

GEORGE BARRETT McMULLEN.

Witnesses:
FRANK L. BELKNAP,
ANNA O'BRIEN.

---

It is hereby certified that in Letters Patent No. 1,040,559, granted October 8, 1912, upon the application of George Barrett McMullen, of Chicago, Illinois, for an improvement in "Processes of Separating Sugar-Cane Into Its Two Chief Structural Parts," an error appears in the printed specification requiring correction as follows: Page 1, line 92, and page 3, line 16, for the word "shifting" read *sifting;* and that the said Letters Patent should be read with this correction therein that the same may conform to the record of the case in the Patent Office.

Signed and sealed this 10th day of December, A. D., 1912.

[SEAL.]

C. C. BILLINGS,
*Acting Commissioner of Patents*

Correction in Letters Patent No. 1,040,559.

It is hereby certified that in Letters Patent No. 1,040,559, granted October 8, 1912, upon the application of George Barrett McMullen, of Chicago, Illinois, for an improvement in "Processes of Separating Sugar-Cane Into Its Two Chief Structural Parts," an error appears in the printed specification requiring correction as follows: Page 1, line 92, and page 3, line 16, for the word "shifting" read *sifting;* and that the said Letters Patent should be read with this correction therein that the same may conform to the record of the case in the Patent Office.

Signed and sealed this 10th day of December, A. D., 1912.

[SEAL.]

C. C. BILLINGS,
*Acting Commissioner of Patents*